(12) United States Patent
Li

(10) Patent No.: US 7,881,392 B2
(45) Date of Patent: Feb. 1, 2011

(54) OFDM/OFDMA TIMING SYNCHRONIZATION USING NON-CONSECUTIVE PILOT SUBCARRIER ASSIGNMENT

(75) Inventor: Qiang Li, Shatin (CN)

(73) Assignee: Hong Kong Applied Science and Technology Research Institute Co., Ltd., Hong Kong (CN)

( * ) Notice: Subject to any disclaimer, the term of this patent is extended or adjusted under 35 U.S.C. 154(b) by 816 days.

(21) Appl. No.: 11/694,647

(22) Filed: Mar. 30, 2007

(65) Prior Publication Data

US 2008/0240263 A1 Oct. 2, 2008

(51) Int. Cl.
H04L 27/28 (2006.01)

(52) U.S. Cl. .................................................... 375/260

(58) Field of Classification Search ................ 375/260, 375/130, 147, 340, 346; 455/277.1, 562.1; 370/355, 342
See application file for complete search history.

(56) References Cited

U.S. PATENT DOCUMENTS

| 7,116,632 | B2 | 10/2006 | Alapuranen | |
|---|---|---|---|---|
| 7,161,972 | B2* | 1/2007 | Huh et al. | 375/147 |
| 7,308,063 | B2 | 12/2007 | Priotti | |
| 7,352,829 | B2 | 4/2008 | Jalloul et al. | |
| 7,397,869 | B2 | 7/2008 | Ginesi et al. | |
| 7,515,641 | B2* | 4/2009 | Yu et al. | 375/260 |
| 7,564,775 | B2 | 7/2009 | Jayaraman et al. | |
| 2003/0043887 | A1 | 3/2003 | Hudson | |
| 2004/0234013 | A1 | 11/2004 | Li et al. | |
| 2005/0084025 | A1 | 4/2005 | Chen | |
| 2005/0135230 | A1 | 6/2005 | Yu et al. | |
| 2005/0135509 | A1 | 6/2005 | Mantravadi et al. | |
| 2005/0141474 | A1 | 6/2005 | Lee et al. | |
| 2006/0018393 | A1 | 1/2006 | Gore et al. | |
| 2006/0098749 | A1 | 5/2006 | Sung et al. | |
| 2006/0227812 | A1 | 10/2006 | Vrcelj et al. | |
| 2007/0177684 | A1 | 8/2007 | Halbauer et al. | |
| 2007/0189404 | A1 | 8/2007 | Baum et al. | |
| 2007/0211806 | A1 | 9/2007 | Mudulodu et al. | |
| 2007/0211809 | A1* | 9/2007 | Kim | 375/260 |
| 2007/0281654 | A1* | 12/2007 | Choi | 455/277.1 |
| 2008/0118009 | A1 | 5/2008 | Chuang et al. | |
| 2008/0130766 | A1* | 6/2008 | Li et al. | 375/260 |

FOREIGN PATENT DOCUMENTS

CN 1334655 2/2002

OTHER PUBLICATIONS

Doo Hwan Lee et al., "Analysis of Ranging Process inIEEE 802.16e Wireless Access Systems," pp. 172-179.
International Search Report issued for PCT/CN2007/070891; Mailing Date: Jan. 24, 2008; 3 Pages.

* cited by examiner

*Primary Examiner*—Khai Tran
(74) *Attorney, Agent, or Firm*—Fulbright & Jaworski L.L.P.

(57) ABSTRACT

Systems and methods which are adapted determine timing with respect to an orthogonal frequency division (OFD) channel, such as may be used with respect to an OFDM or OFDMA systems through reliably identifying timing of a first arriving signal path. Embodiments use deconvolution to construct the channel impulse response associated with a received signal. The first arriving path for the received signal may readily and reliably be determined using the channel impulse response information.

30 Claims, 2 Drawing Sheets

OFDM/OFDMA TIMING SYNCHRONIZATION USING NON-CONSECUTIVE PILOT SUBCARRIER ASSIGNMENT

RELATED APPLICATIONS

The present application is related to commonly assigned U.S. patent application Ser. No. 11/694,616, filed Mar. 30, 2007 and entitled, "OFDM/OFDMA CHANNEL ESTIMATION," which issued as U.S. Pat. No. 7,830,984 on Nov. 9, 2010, the disclosure of which is incorporated herein by reference.

TECHNICAL FIELD

The invention relates generally to determining timing synchronization between wireless communication stations and, more particularly, to determining timing synchronization where non-consecutive pilot subcarrier assignments are used.

BACKGROUND OF THE INVENTION

Orthogonal frequency division multiplexing (OFDM) and Orthogonal frequency division multiple access (OFDMA) systems divide an available bandwidth into a plurality of orthogonal frequency subcarriers. Various subsets of the subcarriers may be assigned for use in communications, such as communications between particular stations. The particular subcarriers and the number of subcarriers assigned for use with respect to a communication may be based upon such considerations as the bandwidth or throughput to be provided by the radio link, interference mitigation or avoidance, etcetera. In an OFDMA system, multiple stations (e.g., subscriber stations) may be simultaneously provided communication links with a common access point (e.g., base station) or other station by simultaneously assigning different subsets of the subcarriers for the links of the multiple stations.

In OFDM and OFDMA communications, a signal is split into a number of sub-signals which are then transmitted simultaneously on different ones of the subcarriers. These separate subsignals may then be recombined by a receiving station to form the original signal for further processing etcetera.

Communication access is typically provided to the various stations through a defined protocol, such as may require access, resource allocation, authorization, and registration. It is common to use a ranging process as part of an access protocol in OFDM and OFDMA systems. In a typical ranging process, a subscriber station desiring access to network resources transmits a ranging code on a pre-specified set of subcarriers. That is, the subscriber station transmits a ranging code spread over multiple subcarriers which form the ranging subchannel. The ranging code may be a random or quasi-random code (e.g., code division multiple access (CDMA) chip code). The base station extracts the ranging code from the received signal and estimates the corresponding time delay. The time delay is used by the base station for transmission time delay estimation used with respect to downlink and uplink resources assigned to the subscriber station for further communications.

In a multiple access system, other subscriber stations are generally transmitting data during times in which a subscribed station is transmitting a ranging request. Although interference from such simultaneous transmissions may be mitigated according to the cross-correlation property in an ideal environment, the channel is typically affected by multipath fading, etcetera. Such channel characteristics not only present interference such that a particular subscriber station's ranging code is more difficult to isolate in the received signal, but also present issues with respect to accurately determining the time delay associated with the ranging signal. That is, the first arriving path for the ranging signal provides the best estimate of time delay. However, the ranging processes implemented previously have been unable to reliably identify the ranging signal of the first arriving path. The following equations set forth prior art ranging signal processing for determining time delay in an OFDM system.

The received ranging signal may be represented as:

$$r(n) = x(n) * h(n) \qquad (1)$$

Where, in the above equation, x(n) denotes the transmitted ranging signal and h(n) denotes the channel impulse response, represented as:

$$h(n) = \sum_{i=0}^{L-1} \alpha_i \delta(n - d_i) \qquad (2)$$

To simplify the math operations, synchronization is performed in the frequency domain. Accordingly, the foregoing time domain equations may be transformed to the frequency domain using N-point fast Fourier transforms (FFT), such that:

$$R(k) = X(k)H(k) \qquad (3)$$

Where, in the above equation:

$$X(k) = \sum_{n=0}^{N-1} x(n) w_N^{kn} \qquad (4)$$

and;

$$H(k) = \sum_{n=0}^{N-1} h(n) w_N^{kn} = \sum_{i=0}^{L-1} \alpha_i w_N^{kd}, \qquad (5)$$

To determine a time delay of the received ranging signal, various different delays are tried and the partial channel estimation is computed by using inverse fast Fourier transform (IFFT) as below:

$$\begin{aligned}
z(m) &= \sum_{k=0}^{N-1} R(k) X*(k) w_n^{-km} \quad \text{where} \\
&= \sum_{k=0}^{N-1} |X(k)|^2 H(k) w_N^{-km} \quad w_N = \exp(-j2\pi/N), \\
&\qquad\qquad\qquad\qquad\qquad X(k) = \begin{cases} \pm 1 & k \in p \\ 0 & \text{otherwise} \end{cases} \\
&= \sum_{k=0}^{N-1} I(k) H(k) w_M^{-km} \quad \text{and} \\
&= \sum_{i=0}^{L-1} \sum_{k=0}^{N-1} \alpha_i I(k) w_N^{-k(m-d_i)} \quad I(k) = \begin{cases} 1 & k \in p \\ 0 & \text{otherwise} \end{cases}
\end{aligned} \qquad (6)$$

The peak IFFT value from the above channel equation is used to determine the time delay.

As shown above, prior ranging processes have merely relied upon peak detection with respect to the received ranging signal. However, the peak often does not correspond to the first path (i.e., the first path is often not the strongest path). Establishing time delay based upon the ranging signal as received in other than the first path results in improper timing and may cause undesired signal characteristics such as inter-symbol interference (ISI). That is, if the timing is determined by the maximum of the above IFFT and the first path is not the strongest path, part of the cyclic prefix of the next symbol will be included in the FFT window of the current symbol. Thus ISI will be generated due to wrong timing. Accordingly, the foregoing ranging signal time delay determination is less than optimal.

Further exacerbating the problems associated with ranging signal time delay determination according to the prior art is that the foregoing peak determination assumes that the ranging subchannel utilizes consecutive subcarriers (i.e., subcarriers which are adjacent to one another, or nearest one another with some guard band disposed between, within the spectrum of available bandwidth) and/or which are uniformly distributed (i.e., consistent spacing is provided between all subcarriers and their nearest neighbor subcarriers). Where such ranging subchannel subcarriers are consecutive and/or uniformly spaced, the foregoing IFFT calculation results in several relatively clearly defined peaks corresponding to different ranging signal paths. However, it has been discovered that the ranging subchannel subcarriers are often not consecutive and/or uniformly spaced. Where the ranging subchannel subcarriers are not consecutive and/or not uniformly spaced, the foregoing IFFT calculation contains many sidelobes (spurious peaks), further obscuring the peak associated with the ranging signal first path. Accordingly, the traditional techniques for determining time delay have not been capable of reliably establishing the timing of the first arriving path.

BRIEF SUMMARY OF THE INVENTION

The present invention is directed to systems and methods which are adapted determine timing with respect to an orthogonal frequency division (OFD) channel, such as may be used with respect to an OFDM or OFDMA system, through reliably establishing timing determinations based upon the first arriving path of a received signal, such as a ranging signal or other pilot signal. Embodiments of the invention use deconvolution to construct the channel impulse response for identifying a first arriving path of a ranging signal, wherein the first arriving path is utilized to determine a time delay with respect to the channel.

According to embodiments of the invention, a channel equation is utilized to provide a partial channel estimation (z(m)) using an inverse fast Fourier transform (IFFT) of the product of R(k) (the fast Fourier transform (FFT) of the received ranging signal (r(n))) and conjugate of X(k) (the FFT of the known pilot, (x(n))). It was found in developing the present invention that the partial channel estimation (z(m)) corresponds to the convolution of an inverse fast Fourier transform (IFFT) of a function (I(k)) which indicates which subcarriers are used in the ranging channel, and thus which is related to the time domain pilot position mask (s(m)), and the channel impulse response (h(m)). Accordingly, the channel impulse response (h(m)) may be solved for using the calculated partial channel estimation (z(m)) and the known time domain pilot position mask (s(m)) using a deconvolution. From the channel impulse response (h)) the first arriving path for the ranging signal may readily and reliably be determined according to embodiments of the invention.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
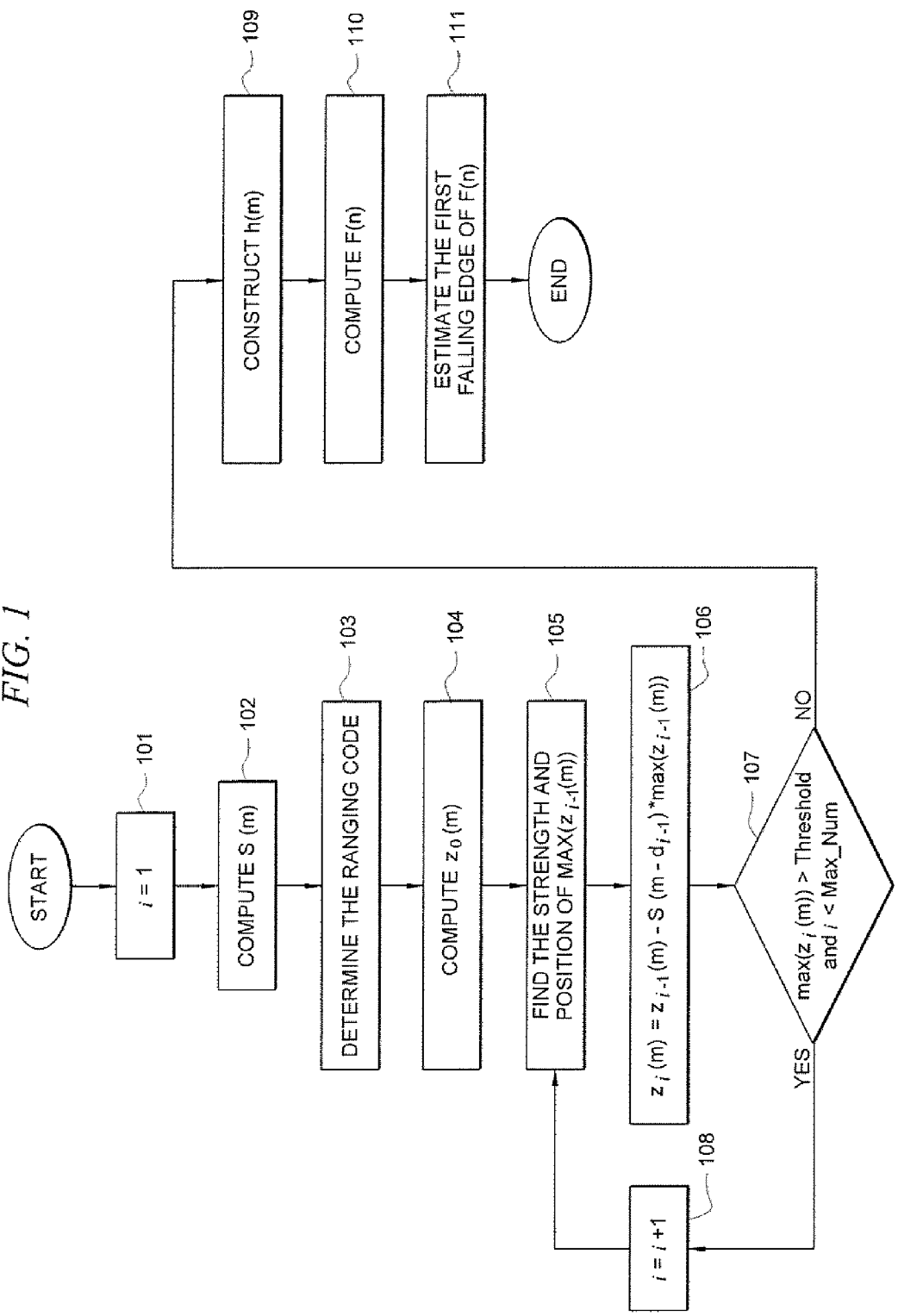
FIG. 1 shows a flow diagram of operation to identify a first arriving path of a received signal according to an embodiment of the invention.

Directing attention to FIG. 1, a flow diagram illustrating operation to identify the first path associated with a received signal, such as may be used in determining timing for synchronization, according to an embodiment of the invention is shown. Although the embodiment of FIG. 1 is shown with reference to a ranging code or ranging signal, such as may be used in orthogonal frequency division multiplex (OFDM) or orthogonal frequency division multiple access (OFDMA) systems, it should be appreciated that other signals (e.g., pilot signals) may be utilized according to embodiments of the invention.

The processes illustrated in the flow diagram of FIG. 1 may be performed on one or more platforms. According to a preferred embodiment, the illustrated processes are performed by base station or access point (e.g., an OFDM or OFDMA base station) signal processing systems. Such systems may comprise, for example, processor-based systems, such as a general purpose computer system operable under control of an instruction set defining operation as described herein or a special purpose processor configured to provide operation as described herein. Embodiments of the invention may utilize circuitry configured to provide operation as described herein, such as in the form of application specific integrated circuits (ASICs). Moreover, embodiments of the invention may utilize combinations of the foregoing, if desired.

Figure 2:
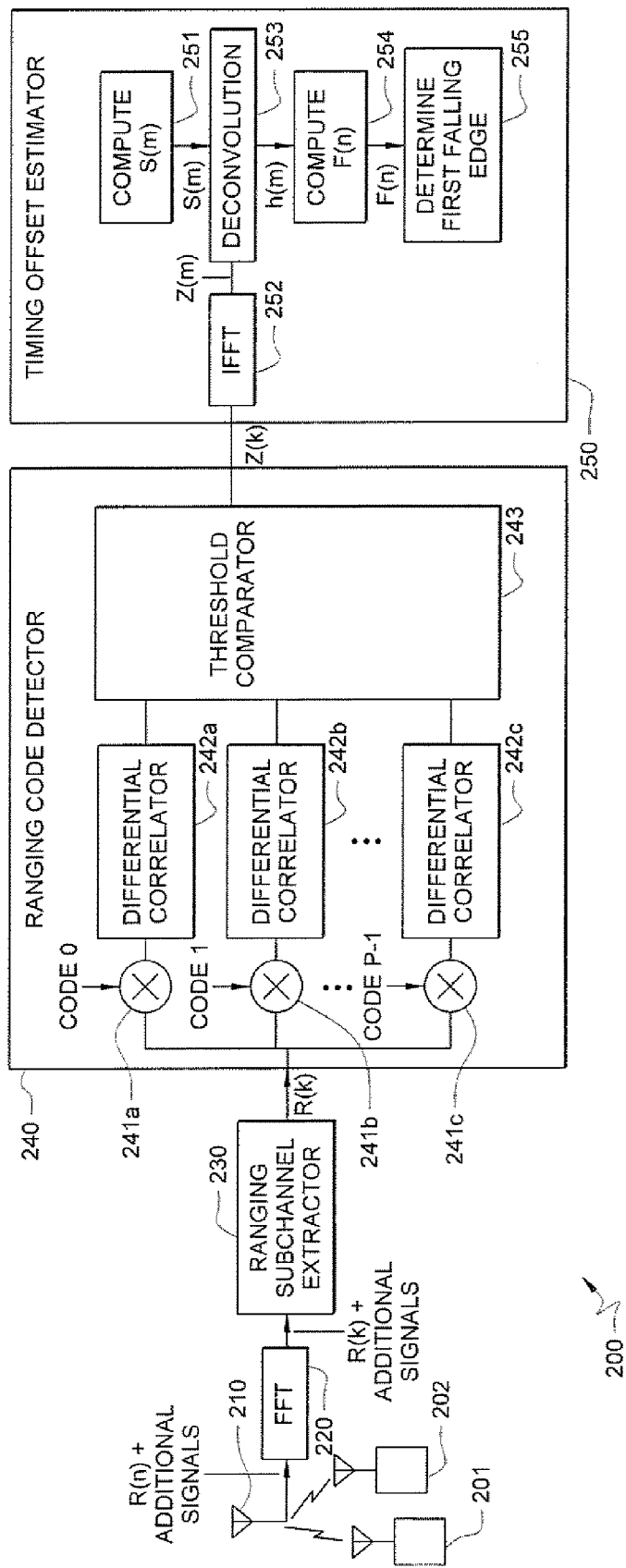
FIG. 2 shows a functional block diagram of a system adapted to provide operation as shown in FIG. 1.

FIG. 2 shows a functional block diagram of a system adapted to provide signal processing as set forth in the flow diagram of FIG. 1. System 200 of FIG. 2 may, for example, be implemented in a processor-based system of an OFDMA base station according to an embodiment of the invention.

It was found in developing the present invention that the partial channel estimation (z(m)) corresponds to the convolution of an inverse fast Fourier transform (IFFT) of a function (I(k)), which is related to the time domain pilot position mask (s(m)), and the channel impulse response (h(m)). That is:

$$z(m)=s(m)*h(m) \quad (7)$$

and $$s(m) = \sum_{k=0}^{N-1} I(k) w_N^{-km} \quad (8)$$

Accordingly, the channel impulse response (h(m)) may be solved for using the calculated partial channel estimation (z(m)) and the known time domain pilot position mask (s(m)) using a deconvolution. The first arriving path of the ranging signal may be determined from the foregoing channel impulse response (h(m)). Accordingly, the flow diagram of FIG. 1, as may be implemented using the functional blocks of FIG. 2, operates to determine the impulse response (h(m)) from a deconvolution of the partial channel estimation (z(m)) given the time domain pilot position mask (s(m)). Embodiments of the invention use the channel impulse response (h(m)) for identifying a first arriving path of a ranging signal, wherein the first arriving path is utilized to determine a time delay with respect to the channel.

Referring again to FIG. 1, operation according to the illustrated embodiment begins at block 101 wherein process variables are initialized. For example, the illustrated embodiment sets the deconvolution iteration increment variable (i), used in channel impulse response (h(m)) estimation, to an initial value.

At block 102 of the illustrated embodiment, the time domain pilot position mask (s(m)) is calculated. For example, compute s(m) logic 251 of FIG. 2 may be utilized to calculate the time domain pilot position mask. It should be appreciated that the particular subcarriers used to provide the ranging channel are known, which in the frequency domain may be represented as I(k). Accordingly, the time domain pilot position mask (s(m)) may be calculated from the IFFT of I(k) according to embodiments of the invention. It should be appreciated that the ranging channel may not utilize consecutive subcarriers (i.e., subcarriers which are adjacent to one another, or nearest one another with some guard band disposed between, within the spectrum of available bandwidth) and/or which are not uniformly distributed (e.g., subcarriers where the spacing between neighboring subcarriers is not consistent).

At block 103 of the illustrated embodiment the ranging code is determined. For example, a subscriber station, such as subscriber station 201 of FIG. 2, may transmit a ranging signal (e.g., x(n)) including a ranging code (e.g., random or pseudo-random code) on a pre-specified set of subcarriers which form a ranging subchannel which is received by an antenna system of a corresponding base station, such as antenna 210 of system 200. It should be appreciated that other signals, such as data signals from subscriber station 202, may be received simultaneously by system 200. However, in an OFDMA system, the signals of the various subscriber stations will be communicated using different subsets of the orthogonal subcarriers.

In order to simplify signal processing, the illustrated embodiment transforms the received signal from the time domain to the frequency domain using fast Fourier transform 220 of FIG. 2. The frequency domain signal is provided to ranging subchannel extractor 230 of the illustrated embodiment in order to extract the ranging signal from the received signal. For example, the subcarriers of the ranging subchannel may be isolated from the remaining subcarriers by ranging subchannel extractor 230 for further processing by system 200.

The ranging signal may be further processed to determine the ranging code used therein. For example, ranging code detector 240 may apply the possible ranging codes (e.g., using multiplication) to the received ranging signal (e.g., using mixers 241a-241c) and use differential correlation (e.g., differential correlators 242l-242c) and threshold comparison (e.g., threshold comparator 243) in determining the ranging code.

Having determined the ranging code, a partial channel estimation for the ranging signal may be determined (e.g., equation (6), setting forth a traditional technique for determining a partial channel estimation). Accordingly, at block 104 of the illustrated embodiment, a partial channel estimation for a first iteration (e.g., index 0) is calculated ($z_0(m)$). Timing offset estimator 250 of the illustrated embodiment calculates a partial channel estimation for a first iteration. For example, ranging code detector 240 may operate to identify the ranging code within the received signal and provide results to inverse fast Fourier transform (IFFT) circuit 252 for computing the partial channel estimation (z(n)) therefrom.

Blocks 105-108 provide a loop for calculating a partial channel estimation for additional iterations and for providing a deconvolution of the partial channel estimation and the time domain pilot position mask (s(m)). Accordingly, block 105 identifies the position and magnitude (and in some embodiments the phase) of the maximum peak within each iteration of the partial channel estimation (z(m)). It should be appreciated that position of various peaks within the partial channel estimation (z(m)) is a result of the ranging code as carried within the ranging channel, thus the foregoing information provides a deconvolution of the partial channel estimation (z(m)) given the time domain pilot position mask (s(m)). Timing offset estimator 250 calculates a partial channel estimation for iterations of the partial channel estimation (z(m)) and provides a deconvolution of the partial channel estimation given the time domain pilot position mask according to an embodiment of the invention. For example, ranging code detector 240 may operate to identify the ranging code within the received signal IFFT circuit 252 computes the partial channel estimation, and deconvolution logic 253 provides peak magnitude (and in some embodiments the phase) and position associated with the deconvolution. The position and magnitude (and in same embodiments the phase) of the maximum peak within z(m) is preferably stored for further processing, such as to construct the channel impulse response (h(m)) and to determine time delay associated with the first arriving path of the ranging signal as is further described below.

At block 106 the partial channel estimation for a next iteration ($z_i(m)$) is determined. For example, the partial channel estimation for a next iteration ($z_i(m)$) is calculated in the illustrated embodiment from the time domain pilot position mask (s(m)) multiplied by the peak magnitude and phase subtracted from the partial channel estimation at the position of the peak is calculated. It should be appreciated that the time domain pilot position mask (s(m)) as subtracted from the partial channel estimation at the position of the peak operates to provide a next iteration of the partial channel estimation which is substantially cleaned of an associated occurrence of the pilot signal. Thus the iterations provided by blocks 105-

108 operate to iteratively mask occurrences of the ranging signal for identifying various peaks associated with multiple paths.

Block 107 provides constraints with respect to the number of iterations the illustrated loop for the calculating and deconvolution of the partial channel estimation. Specifically, the loop of the illustrated embodiment is constrained by the magnitude of the maximum peak within a current iteration of the partial channel estimation (max($z_i$(m)) and the deconvolution iteration increment variable (i). Specifically, when the magnitude of the maximum peak within a current iteration of the partial channel estimation (max($z_i$(m)) falls below a predetermined threshold (e.g., a value within the range of 0.1 to 0.3) it is presumed subsequent iterations of the partial channel estimation are associated with sufficiently small multipath component so as not to be relevant to the identification of the first to arrive path of the ranging signal. Additionally, when the deconvolution iteration increment variable (i) exceeds a predetermined maximum iteration number (e.g., a value of 5 to 10) it is presumed subsequent iterations of the partial channel estimation are associated with sufficiently small multipath components so as not to be relevant to the identification of the first to arrive path of the ranging signal. When the magnitude of the maximum peak within a current iteration of the partial channel estimation (max($z_i$(m)) falls below the predetermined threshold or the deconvolution iteration increment variable (i) exceeds the predetermined maximum iteration number, processing according to the illustrated embodiment proceeds to block 109.

At block 109 the channel impulse response (h(m)) is constructed. As discussed above with respect to equation (7), the channel impulse response (h(m)) may be solved by using deconvolution with the knowledge of the calculated partial channel estimation (z(m)) and the known time domain pilot position mask (s(m)). The peak magnitude and position information with respect to the iterations of the partial channel estimation determined in block 105 above comprise the foregoing deconvolution. Therefore, the channel impulse response (h(m)) is constructed according to the illustrated embodiment from the foregoing peak magnitude (and in some embodiments phase information) and position information for each iteration of the partial channel estimation. Accordingly, deconvolution logic 253 of the illustrated embodiment operates to construct the channel impulse response (h(m)).

Blocks 110 and 111 of the illustrated embodiment cooperate to identify the first arriving path of the ranging signal using the channel impulse response information. Specifically, block 110 of the illustrated embodiment, as may be performed by compute F(n) logic 254, computes the moving average of the channel impulse response (F(n)). For example, the moving average of the channel impulse response may be computed using the following:

$$F(n) = \sum_{m=0}^{N_w-1} |h(m+n)|^2 \quad (9)$$

At block 111, the first arriving path is identified from the first falling edge of the moving average of the channel impulse response. For example, the first arriving path may be estimated, such as by determine first falling edge logic 255, by finding the first n that satisfies the following:

$$F(n+1)-F(n) \geq \text{threshold}, n \geq n_x \quad (10)$$

where $$n_x = \arg\max_n F[n] \quad (11)$$

It should be appreciated that the foregoing provides deconvolution of the partial channel estimation given the time domain pilot position mask to estimate the channel impulse response for identifying a first arriving path of a ranging signal. The information provided with respect to the first arriving path may be utilized to determine a time delay with respect to the channel for facilitating communications, such as by assigning OFDM subcarriers for a communication link and applying the aforementioned time delay with respect to processing a signal received through the subcarriers. Reliable identification of the first arriving path, rather than just a location of a highest magnitude as has been done previously, provides for improved communications, such as by mitigating or eliminating inter-symbol interference (ISI). For example, it has been discovered that the ranging subchannel subcarriers are often not consecutive in various implementations of OFDM and/or OFDMA systems. Where the ranging subchannel subcarriers are not consecutive and/or not uniformly distributed, operation of the present invention is particularly useful to reliably identify the first arriving path, and thus avoid establishing a time delay which results in substantial ISI.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufactures compositions of matter, means, methods, or steps.

What is claimed is:

1. A method comprising:
   constructing channel impulse response information with respect to a received signal using a deconvolution of a partial channel estimation and channel subcarrier information associated with said received signal, wherein said channel subcarrier information includes information with respect to a plurality of orthogonal frequency division subcarriers carrying said received signal, and wherein said constructing channel impulse response information comprises iteratively analyzing said partial channel estimation and stopping the iteratively analyzing if either a number of iterations exceeds a predetermined value or a maximum peak magnitude within a current iteration of said partial channel estimation falls below a predetermined value; and
   determining a timing offset with respect to said received signal using said channel response information.

2. The method of claim 1, wherein said plurality of orthogonal frequency division subcarriers are not consecutive and non-uniformly distributed orthogonal frequency division subcarriers of an orthogonal frequency division bandwidth.

3. The method of claim 2, wherein said plurality of orthogonal frequency division subcarriers comprise a ranging channel.

4. The method of claim 2, wherein said plurality of orthogonal frequency division subcarriers comprise a pilot channel.

5. The method of claim 2, wherein said plurality of orthogonal frequency division subcarrier positions are known at both a transmitting station and a receiving station prior to transmission of said received signal.

6. The method of claim 1, wherein said iteratively analyzing said partial channel estimation comprises:
calculating said partial channel estimation for subsequent iterations, wherein said subsequent iterations have a pilot signal peak detected in a previous iteration masked.

7. The method of claim 1, wherein said iteratively analyzing said partial channel estimation comprises:
identifying a peak magnitude and position within a plurality of iterations of said partial channel estimation.

8. The method of claim 1, wherein said determining a timing offset comprises:
identifying a first arriving path of said received signal using said channel impulse response information.

9. The method of claim 8, wherein said identifying a first arriving path comprises:
calculating a moving average from said channel impulse response information.

10. The method of claim 9, wherein said identifying a first arriving path comprises:
identifying a first falling edge within said moving average, said first arriving path being the path associated with a position of said first falling edge.

11. The method of claim 1, further comprising:
implementing said timing offset for subsequent communications.

12. The method of claim 11, further comprising:
utilizing a second plurality of orthogonal frequency division subcarriers for said subsequent communications.

13. A method comprising:
constructing channel impulse response information with respect to a received signal, said received signal having been received using a plurality of orthogonal frequency division subcarriers; and
identifying a first arriving path of said received signal using said channel impulse response information by calculating a moving average from said channel impulse response information wherein said identifying a first arriving path comprises identifying a first falling edge within said moving average, said first arriving path being the path associated with a position of said first falling edge.

14. The method of claim 13, further comprising:
implementing a timing offset associated with said first arriving path for subsequent communications.

15. The method of claim 14, further comprising:
utilizing a second plurality of orthogonal frequency division subcarriers for said subsequent communications.

16. The method of claim 13, wherein said plurality of orthogonal frequency division subcarriers are not consecutive and non-uniformly distributed orthogonal frequency division subcarriers of an orthogonal frequency division bandwidth.

17. The method of claim 16, wherein said plurality of orthogonal frequency division subcarriers comprise a ranging channel.

18. The method of claim 13, wherein said constructing channel impulse response information comprises:
using a deconvolution of a partial channel estimation and channel subcarrier information associated with said received signal.

19. The method of claim 18, wherein said constructing channel impulse response information comprises:
iteratively analyzing said partial channel estimation.

20. The method of claim 19, wherein said iteratively analyzing said partial channel estimation comprises:
calculating said partial channel estimation for iterations having a previously detected pilot signal peak masked.

21. The method of claim 19, wherein said iteratively analyzing said partial channel estimation comprises:
stopping the iteratively analyzing if either a number of iterations exceeds a predetermined value or a maximum peak magnitude within a current iteration of said partial channel estimation falls below a predetermined value.

22. The method of claim 13, wherein said constructing channel impulse response information comprises:
identifying a plurality of peak magnitudes and positions within said partial channel estimation.

23. A method comprising:
constructing channel impulse response information with respect to a received signal, said received signal having been received using a plurality of orthogonal frequency division subcarriers, wherein said constructing channel impulse response information comprises using a deconvolution of a partial channel estimation and channel subcarrier information associated with said received signal, and iteratively analyzing said partial channel estimation wherein said iteratively analyzing comprises calculating said partial channel estimation for iterations having a previously detected pilot signal peak masked; and
identifying a first arriving path of said received signal using said channel impulse response information by calculating a moving average from said channel impulse response information.

24. The method of claim 23 wherein said identifying a first arriving path comprises identifying a first falling edge within said moving average, said first arriving path being the path associated with a position of said first falling edge.

25. The method of claim 24, further comprising:
implementing a timing offset associated with said first arriving path for subsequent communications.

26. The method of claim 25, further comprising:
utilizing a second plurality of orthogonal frequency division subcarriers for said subsequent communications.

27. The method of claim 23, wherein said plurality of orthogonal frequency division subcarriers are not consecutive and non-uniformly distributed orthogonal frequency division subcarriers of an orthogonal frequency division bandwidth.

28. The method of claim 27, wherein said plurality of orthogonal frequency division subcarriers comprise a ranging channel.

29. The method of claim 23, wherein said constructing channel impulse response information comprises:
identifying a plurality of peak magnitudes and positions within said partial channel estimation.

30. A method comprising:
constructing channel impulse response information with respect to a received signal, said received signal having been received using a plurality of orthogonal frequency division subcarriers, wherein said constructing channel impulse response information comprises identifying a plurality of peak magnitudes and positions within said partial channel estimation; and identifying a first arriving path of said received signal using said channel impulse response information by calculating a moving average from said channel impulse response information.

* * * * *